Aug. 25, 1964 G. W. KEAN 3,145,780
VARIABLE PITCH PROPELLER
Filed Jan. 12, 1962 3 Sheets-Sheet 1

INVENTOR.
GEORGE W. KEAN
BY
ATTORNEY

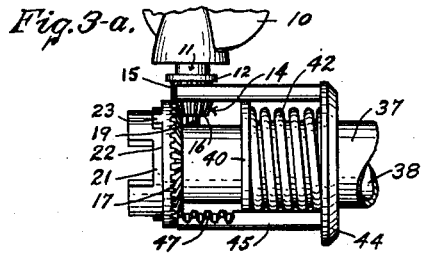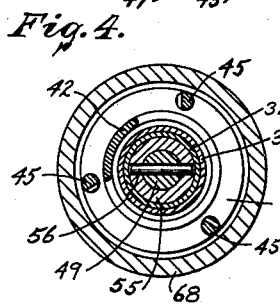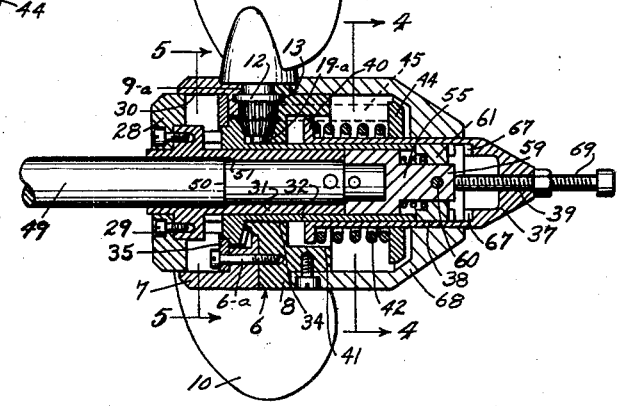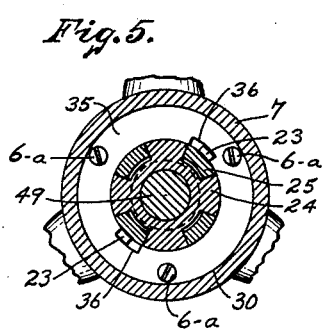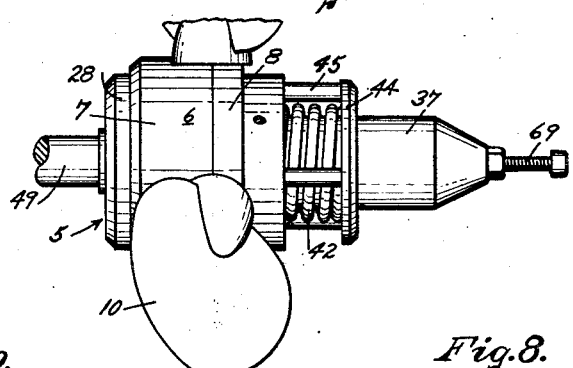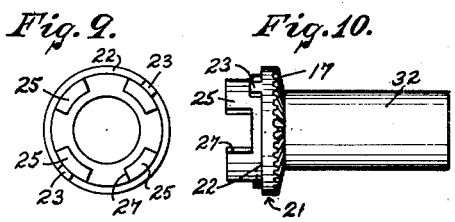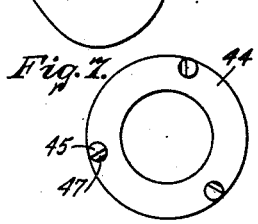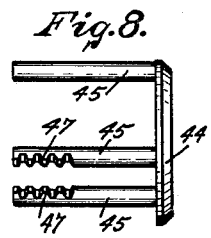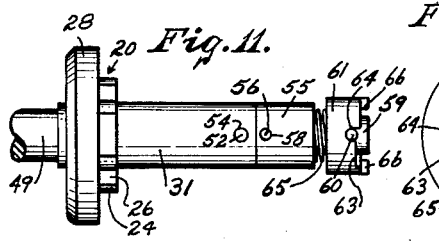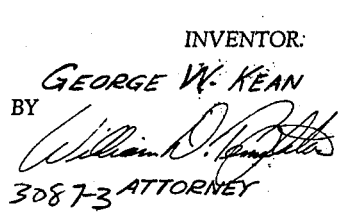

Aug. 25, 1964

G. W. KEAN 3,145,780

VARIABLE PITCH PROPELLER

Filed Jan. 12, 1962

INVENTOR.

GEORGE W. KEAN

BY

ATTORNEY

United States Patent Office 3,145,780
Patented Aug. 25, 1964

3,145,780
VARIABLE PITCH PROPELLER
George W. Kean, Woodland Drive, Granby, Conn., assignor of fifty percent to Angelo J. Roncari, East Granby, and Albert J. Roncari and Raymond A. Roncari, both of Windsor Locks, Conn.
Filed Jan. 12, 1962, Ser. No. 165,966
11 Claims. (Cl. 170—160.13)

This invention relates to propellers and more particularly to variable pitch propellers for outboard motors and the like in which the propeller blades automatically vary between a maximum pitch position and a minimum pitch position seeking a position of maximum operating efficiency consistent with the variable forces acting thereon.

Most outboard motors generally in use are of the common two-cycle type and will not operate at maximum efficiency at both high cruising speeds and slow trolling speeds. When the motor is throttled down to low speeds for long periods of time, for example, the oil mixed with the gasoline, necessary for engine lubrication, quickly fouls the spark plugs.

In order to prevent spark plug fouling, many attempts have been made to slow the forward motion of the boat while permitting the motor to run at a sufficiently high r.p.m. to prevent such fouling. Multi-speed transmissions have been provided for some outboard motors; however, this increases both their weight and cost. Trolling plates on the propeller will also considerably reduce its efficiency and thereby permit a higher r.p.m. setting, but such plates are inconvenient to attach and must be detached when it is desired to travel at normal cruising speeds. Likewise, adjusting means have been provided on some propeller assemblies whereby the blades may be manually adjusted for varying the pitch positions thereof in order to obtain a low pitch position for normal cruising speeds. It is obvious that such manual adjustment of the propeller blades is both inconvenient and time consuming.

Recently, propeller assemblies have been provided in which the pitch of the blades will automatically vary under certain operating conditions thereof and my invention particularly relates to such automatic, variable pitch propellers.

In the propulsion of a boat or other object through a fluid medium, such as water, by means of a propeller, there are many interrelated, variable force factors acting upon both the boat and the propeller which affect the operation thereof. Several such variables are the motor horsepower acting upon the propeller at any given moment; the r.p.m. of the propeller blades; the resistance to rotation thereof; the resistance to the forward motion of the boat through the water and the pitch of the propeller blades. It is well known that the forward movement of the boat varies with both the r.p.m. and the pitch of the blades, and for any given number of r.p.m.'s such movement is directly proportional to the pitch of the propeller blades and can increase only if the pitch of the blades increases. In other words, in order to take advantage of the lowest efficient r.p.m. of the motor and yet obtain the maximum forward movement of the boat, there must be a relatively high pitch to the propeller blades.

It is likewise well known in the art that when the propeller is operating with the blades at full pitch the resistance offered by the water to the rotation thereof is at a maximum, and is also a function of forward motion, being greatest at zero forward motion, decreasing as forward motion increases.

Since the force required to propel a boat through water at a constant speed is in equilibrium with all resistance forces acting the oppose such movement, there must be an unbalanced or greater propulsive force acting on the boat during acceleration. This force is provided by increasing the thrust developed by the propeller and the maximum thrust for any given r.p.m. setting thereof is developed when the blades are in a minimum pitch position.

When the forces causing acceleration of the boat become in equilibrium with the resistance forces tending to oppose its forward motion, the velocity of the boat becomes constant and it is then most efficient for both the motor and propeller operation to maintain the highest allowable blade pitch and the lowest r.p.m. of the motor consistent with maintaining the desired constant forward speed.

My new and improved propeller assembly incorporates means in the structure thereof whereby its propeller blades will at all times function in a position of maximum allowable pitch consistent with the forces acting thereupon, automatically seeking the correct blade pitch within a predetermined maximum and minimum range for the most efficient operation thereof at all r.p.m. settings of the motor.

Accordingly, it is an object of the present invention to provide a propeller for use with a marine propulsion motor, in which the pitch of the blades thereof may be automatically adjusted by the forces acting thereupon to a position of maximum operating efficiency.

Another object of the present invention is to provide such a variable pitch propeller which will automatically seek the most efficient blade pitch within a predetermined maximum and minimum range consistent with the forces acting thereupon.

A further object of the present invention is to provide a variable pitch propeller which is readily adaptable for use with marine outboard motors and the like and which may be readily substituted for the propellers presently used thereon.

It is still another object of the present invention to provide an automatically variable pitch propeller which is adaptable for use with small boats as well as large boats.

It is another object of the present invention to provide a variable pitch propeller having a minimum number of parts whereby it will be durable and trouble free in operation.

Still another object of the present invention is to provide a propeller assembly which will function at all throttle settings of the power source to automatically vary the pitch of the blades thereof consistent with maximum operating efficiency.

A still further object of the present invention is to provide a propeller which will function to prevent overloading of the power source at all throttle settings.

Other objects and advantages of the invention will become apparent from the following detailed description and drawings in which:

FIG. 3 is a side view of the propeller, partially in section, on line 3—3 of FIG. 2.

FIG. 3-a is a sectional side view illustrating the rack and pinion means for varying the blade pitch.

FIG. 4 is a sectional end view taken on line 4—4 of FIG. 3.

FIG. 5 is a similar view taken on line 5—5 of FIG. 3.

FIG. 6 is an elevational side view of the propeller assembly, shown with the cover portion of the body removed therefrom.

FIGS. 7 through 12 are elevational views illustrating particular elements embodied in my novel variable pitch propeller.

Figure 13:
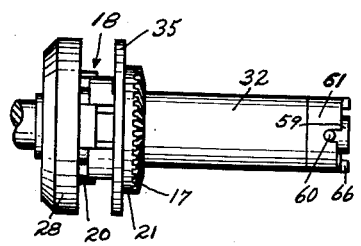

FIG. 13 is an elevational side view of the coupling employed in the propeller of my invention, showing the normal positions of the parts thereof.

Figure 14:
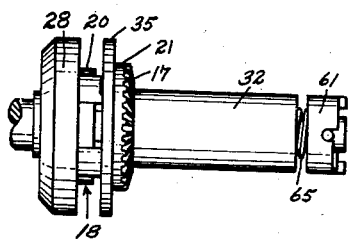

FIG. 14 is a view similar to FIG. 13 only showing the mating parts of the coupling in full engagement.

Figure 15:
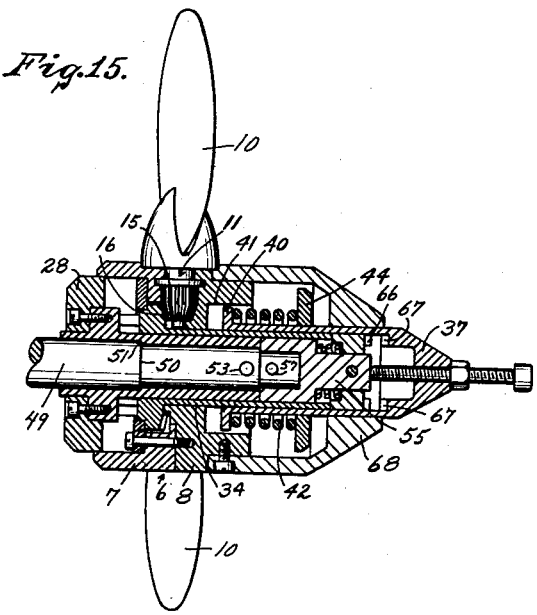

FIG. 15 is a view similar to FIG. 3, showing, however, the blades of my novel propeller in a position of minimum pitch.

Figure 16:
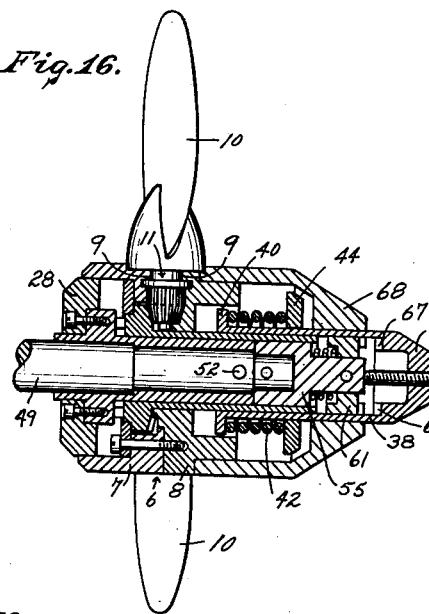

FIG. 16 is a view similar to FIG. 15 but showing the blades in a position of minimum pitch and forward on the drive shaft.

Figure 17:
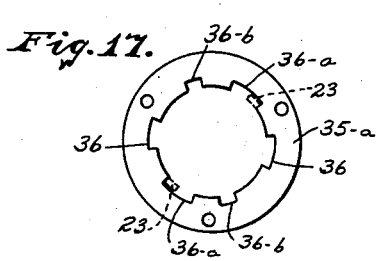

FIG. 17 is an elevational view of an alternate form of retaining ring for use in the propeller of the present invention.

As shown in the drawings, my improved automatically variable pitch propeller comprises a generally cylindrical body 5 which includes a hub 6 comprising an inner portion 7 and an outer portion 8 which are joined together by screws 6–a. Said inner and outer portions are provided with a plurality of complementary, opposed recesses 9 therein forming a plurality of radial openings 9–a in said hub for the reception of radially extending propeller blades 10, each of identical configuration and mounted on said hub for limited rotational movement about its longitudinal axis. Each of said blades has an axially extending journal portion 11 at its inner end which rotates in its respective opening 9–a as shown in the drawings, and an integral annular retaining collar 12 which is rotatably received in an internal annular groove 13 concentric with the opening 9–a formed by said recesses 9. A gear 14 is provided on the inner end of said journal portion and said gear comprises a pinion portion 15 and a bevelled portion 16 which meshes with an annular bevel gear 17, said bevel gear 17 forming part of a coupling 18 as best shown in FIGS. 13 and 14. The inner, terminal end of the journal portion 11 forms a bearing 19 which is rotatable in an opening 19–a in the hub portion 8.

The coupling 18 comprises two mating parts, an inner collar 20 and an outer collar 21 which carries the bevel gear 17 at the outer end thereof, as best shown in FIG. 10. Said outer collar 21 has an inwardly facing annular shoulder 22 therearound and a pair of diametrically opposed stops 23—23 extend axially inwardly from said shoulder. The inner and outer collars 20 and 21 are provided with opposed, axially extending, interengageable projections 24 and 25, respectively, having radially disposed bearing surfaces 26 and 27, respectively, thereon. Said projections prevent relative rotation of the collars but permit relative axial movement thereof.

A closure ring 28 is secured by screws 29 to the inner end of the inner collar 20 of the said coupling 18 and the peripheral surface of said ring is adapted for relative sliding engagement with the wall of a coaxial recess 30 in the inner end of the inner portion 7 of the said hub 6. An elongated sleeve 31 extends outwardly from said inner collar 20 and into a separate, coaxial, elongated sleeve 32 extending outwardly from the said outer collar 21 through a coaxial opening 34 in the said outer member 8 of the hub 6, the said sleeves 31 and 32 being arranged for relative, limited axial sliding movement with respect to each other.

The outer collar 21 is retained against axial movement relatively to the hub 6 to retain the bevel gear in meshing engagement with the bevelled portions 16 of the gears 14 by a retaining ring 35. Positioned in the recess 30 as shown in FIG. 3 and removably secured therein by the screws 6–a, or in any other like manner, the said retaining ring overlies the shoulder 22 on said outer collar 21 and is provided with arcuate slots 36—36 adapted to receive said stops 23, as best shown in FIG. 5, to permit limited rotational movement of the gear 17 relative to the hub 6 and to thereby predetermine the maximum and minimum pitch positions of the said blades 10 and the range within which the pitch of the said blades may vary.

My improved automatically variable pitch propeller also includes a tubular spring support 37 having an axial bore 38 therein which slidably receives the sleeve 32, and an internally threaded axial hole 39 at the outer end thereof communicating with said bore. An annular flange 40 is provided on the inner end of said support 37, and said flange is slidably disposed in an annular recess 41 in the outer portion 8 of the said hub 6 as shown in FIG. 3.

A helical compression spring 42 or its equivalent is positioned on said support 37 with its inner end abutting the said flange 40 and with its outer end abutting an annular rack support 44 surrounding said spring support. Said rack support carries a plurality of annularly spaced, inwardly extending racks 45 which are disposed radially outwardly of said spring 42. Said racks 45, as best shown in FIGS. 7 and 8, each comprise an elongated rod-like portion having a plurality of transverse teeth 47 thereon adapted to mesh with the teeth on the pinion portion 15 of its respective gear 14. The racks 45 are supported for axial movement within said hub 6 by complementary, axially extending guideways 48 therein which communicate with the radial openings 9–a formed by the recesses 9 and serve to retain the rack in engagement with the pinion portion 15 of the said gear 14.

My new and improved automatically variable pitch propeller is adapted to be mounted on a drive shaft 49 of a conventional marine engine. Said shaft extends coaxially through the sleeve 31 as shown in the drawings and is provided with an outwardly facing shoulder 50 which is engaged by an opposed shoulder 51 formed internally of said sleeve 31 for positioning said sleeve on said shaft. The sleeve 31 is fixedly secured to said shaft in its aforesaid position by a shear pin 52 which extends through aligned transverse openings 53 and 54 in said shaft and sleeve, respectively. A shaft extension member 55 is positioned on the terminal portion of the said shaft 49 and is retained thereon by a suitable pin 56 extending through aligned transverse openings 57 and 58 in said shaft and shaft extension member, respectively. Said shaft extension member 55 is provided with a reduced end portion 59 having a hole extending diametrically therethrough which receives a retaining pin 60. Said reduced end portion 59 receives a retaining member 61 which is held thereon by said pin 60 and functions to retain the entire propeller assembly on the shaft as will be later described.

The retaining member 61 is provided internally with a pair of opposed axially extending slots 62—62 which communicate with opposed circumferentially extending recesses 63—63 in the outer end of said member. Said recesses in turn communicate with a pair of opposed notches 64—64 which extend inwardly therefrom and are adapted to receive the projecting ends of the retaining pin 60. A compression spring 65 is preferably provided between the retaining member and the shaft extension to retain the said member in locking engagement with the pin 60. The above-described structure constitutes a bayonet-type locking structure for non-rotatably affixing the retaining member to the reduced end of the shaft extension 55. The retaining member is also provided with a pair of opposed axially extending projections 66—66 on the outer end thereof and the tubular spring support 37 is provided with a pair of complementary recesses 67—67 at the end of the bore 38 therein which are adapted to receive said projections 66—66 to permit attachment of said retaining member to the shaft extension 55 during installation of the propeller.

A cover 68 is provided for enclosing the rear portion of my propeller assembly as shown in FIG. 3.

My propeller assembly is mounted to the drive shaft 49 by inserting the said drive shaft, with the closure ring 28, inner collar 20, sleeve 31 and shaft extension 55 secured thereon, into and through the sleeve 32 into the bore 38 of the tubular support 37 as shown in FIGS. 3, 15 and 16. By aligning the projecting ends of the retaining pin 60 with the slots 62—62 of the retaining member 61 which is non-rotatably disposed at the end of the bore 38 by engagement of the projections 66—66 with the recesses 67—67, the said pin may be rotated into locking engagement with the notches 64—64 of said retaining member. The said assembly is thereby removably secured to said shaft. An adjusting screw 69 is provided to space the end of the bore 38 from the shaft extension and retaining member and disengage the projections 66—66 from the recesses 67—67 to permit rotational movement of the said member within said bore 38.

As the said adjusting screw urges the spring support 37 from the end of the shaft, it loads the spring 42 retained between the flange 40 of the said spring support and the said rack support 44 to a predetermined load value consistent with the force factors acting upon the propeller at the minimum operating speed thereof.

Figure 1:
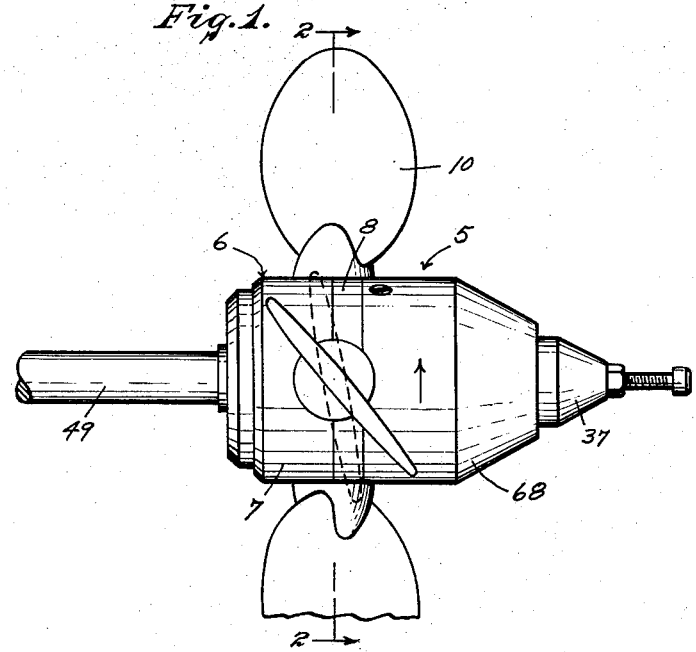
FIG. 1 is an elevational side view of a marine propeller assembly embodying the present invention and showing the propeller blades in maximum pitch position.

In operation the propeller assembly shown in the drawings rotates in a clockwise direction as indicated by the arrow in FIG. 1 for forward movement. When at rest and with no external forces acting on the blades 10, said blades are yieldingly retained in a predetermined maximum pitch position, shown in full lines in FIG. 1, by the pre-loaded, helical compression spring 42 confined between the stationary flange 40 and the rack support 44. Said spring biases the rack support and the racks 45 carried thereby axially outwardly and through engagement of the teeth 47 with the pinion portions 15 of the gears 14 urges the said blades to rotate about their own axes in a counterclockwise direction as viewed in FIG. 1. The tapered portions 16 of the said gears 14 engaged with the bevel gear 17 are thus caused to rotate about the gear 17 which is rendered non-rotatable with respect to the shaft 49 through engagement of the inner and outer collars of the coupling 18. As the said tapered portions 16 of the gears 14 rotate about the bevel gear 17, the said hub 6 and the parts carried thereby including the spring support 37, the spring 42 and the racks and rack support 45 and 55, respectively, rotate about the said shaft 49 until the stop 23—23 engage the ends of the slots 36—36 in the retaining ring 35, as shown in FIG. 5, thereby preventing further rotation of the hub with respect to the shaft beyond the predetermined maximum pitch position of the said blades.

When the propeller assembly is at rest in water with the blades in maximum pitch position, the resistance to rotation of the assembly offered by the water is greatest, and since this resistance is a function of forward speed, it decreases as the boat gains forward speed. As previously explained, for forward acceleration it is highly desirable to decrease this resistance by reducing the pitch of the blades to develop maximum thrust.

In my improved automatically variable pitch propeller, torque applied to the drive shaft 49 is transmitted from said shaft through the pin 52 and the sleeve 31 to the inner collar 20 thereof to the interengaged projections 24 and 25 of the coupling 18. The bevel gear 17 on the outer collar of said coupling transmits the applied torque to the blades 10 and the body 5 through engagement with the bevelled portions 16 of the gears 14 on the journal portions 11 of the said blades.

Figure 2:
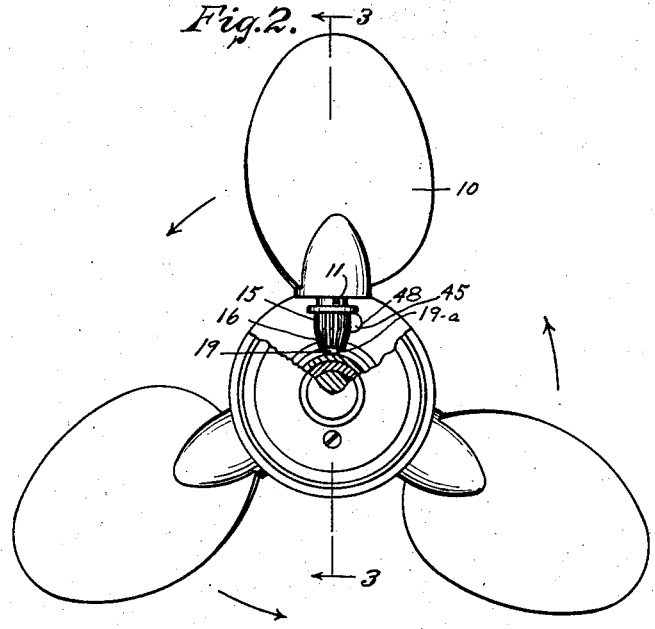
FIG. 2 is an elevational front view thereof partially in section on line 2—2 of FIG. 1, and showing the means for rotating the propeller blades into varying positions of blade pitch.

It will be apparent to one skilled in the art that if the resistance to rotation of the propeller offered by the water is in balance with or less than the opposing force exerted by the helical compression spring 42 which tends to rotate the body of the propeller in a clockwise direction as viewed in FIG. 2, about the gear 17, the entire propeller assembly will start to rotate with the shaft 49 when torque is applied thereto and the blades 10 will remain in a maximum pitch position. If, however, the rotational force applied to the drive shaft 49 is greater than the resistance to rotation of the propeller offered by the water, the drive shaft and the parts which are fixed relative thereto, namely the bevel gear 17, will rotate relatively to and before the body portion of the propeller in the direction of the applied torque. The rotation of the bevel gear 17 relatively to the gears 14 causes clockwise rotation, with respect to FIG. 1, of the blades 10 into a lower pitch position and if the difference between the forces, applied torque and resistance to rotation-acting on the propeller is great enough, the blades will be rotated about their axes to minimum pitch position, as shown in dotted lines in FIG. 1. As the blades 10 rotate toward minimum pitch position, the pinion gears 15 thereof which are in engagement with the teeth 47 of the racks 45 likewise rotate and move said racks and the rack support 44 axially inwardly to compress the spring 42 against the stationary flange 40, further loading the said spring. With the pitch of the blades thus reduced, the resistance to rotation offered by the water is proportionately decreased and brought into balance with the opposing force of the said spring 42.

Since the resistance to rotation of the propeller is a function of forward speed, as the forward speed increases there is a proportionate reduction of resistance to rotation acting upon the blades. The biasing force of the spring 42 will therefore exceed the force of the resistance to rotation and will automatically increase the pitch of the blades until the forces acting thereon are again in balance with the biasing force of the spring.

It is apparent that there is a constant interplay between the forces acting upon the surfaces of the blades tending to cause them to seek a position of lower pitch and the biasing force of the spring 42 acting through the racks 45 and gears 14 seeking to increase the pitch of the blades and that the pitch of the blades remains constant only when those forces are in balance. It is also apparent that for any given throttle setting the pitch of the propeller blades is constantly changing as the propeller travels through the water, the changes being caused by such variable factors as water currents, surface waves, wind resistance and so forth, each of the variables in some way affecting the load on the motor, as a result of which the propeller blades are constantly seeking a pitch position consistent with the maximum operating efficiency thereof at any given power setting.

When the body portion 5 of the propeller is in its outermost position on the shaft 49 as shown in FIG. 1 the distance traversed by the rack when the blades 10 move from maximum to minimum pitch is not sufficient to fully load the spring 42. Under certain conditions encountered in the use of my improved propeller, particularly in connection with its use with motors of high horsepower operating in their upper limits, the forces acting on the blades 10 urging rotation thereof about their axes to minimum pitch positions are very great. Under such conditions the said forces may be so disproportionately greater than the force exerted by the spring in its partially loaded state that the propeller would be operating with its blades at minimum pitch for an unduly long period of time before the forward motion of the boat increased sufficiently to reduce the resistance forces acting on the blades to bring them within the range of the opposed biasing force of the partially compressed spring 42. Therefore, in order to prevent the blades 10 from being held in their minimum pitch positions under such conditions, I have provided means in my improved propeller for further loading the spring 42 to balance such increased resistance forces.

As previously described, the spring 42 is confined between the stationary flange 40 of the tubular spring support 37 and the annular rack support 44 and the outwardly directed axial biasing force exerted thereby acts on the blades 10 through the racks 45 and the gears 14. The outward axial force exerted by the said spring 42 is thus transmitted to the coupling 18 through the hub 6 and urges the outer end of the sleeve 32 outwardly into engagement with the retaining member 61 which restrains the assembly from further outward movement as shown in FIG. 3. The closure ring 28, the inner collar 20 and the sleeve 31 are carried by and non-rotatably secured to the drive shaft 49 and restrained from relative axial movement therewith by the shear pin 52. When the said propeller assembly is mounted on the shaft 49 and the sleeve 32 positioned against the retaining member 61 as shown in FIG. 13, the said inner and outer collars 20 and 21, respectively, are disposed with the terminal portions of the projections 24 and 25 thereof interengaged, with said collars axially spaced apart whereby said coupling permits additional forward axial movement of the collar 21 to accommodate full engagement of the projections as shown in FIG. 14.

When torque or rotational force is transmitted to the drive shaft sufficient to completely overpower the biasing force of the spring 42, as aforementioned, and the blades are rotated by the resistance forces into a minimum pitch position predetermined by the arcuate extent of the slot 36, a greatly increased thrust will be developed by the propeller. Before the boat responds to the increased thrust, however, the forward force thereof acts upon the propeller assembly itself causing a forward axial movement of the hub 6 with respect to the drive shaft 49 and the parts secured thereto. As the hub 6 is urged forward on the shaft, the parts carried thereby—the blades 10, the racks 45 and the outer collar 21—are also moved axially forward until there is full engagement of the projections 24 and 25.

Since the flange 40 of the tubular spring support 37 is restrained from forward movement by engagement of the adjusting screw 69 with the end of the shaft 49, it is apparent that such forward movement of the assembly further compresses the spring 42 reloading it until the rearwardly directed axial biasing force thereof balances the resistance forces acting on the blades 10. As the forward speed of the boat increases, the biasing force of the reloaded spring rotates the blades into a position of increased pitch consistent with the reduction of the resistance forces acting thereon, seeking the most efficient operation of the propeller relative to the applied torque and forward speed.

It is apparent that I have provided a variable pitch propeller that will automatically vary the pitch of the blades thereof within a predetermined range of minimum to maximum pitch at all power settings of the motor and which will also constantly seek to operate at the most efficient pitch position of the blades consistent with the many variable forces acting thereon. It is to be understood that while I have shown and described the use of a helical compression spring in my improved propeller assembly, equivalents thereof may be used therefor and are within the scope of my invention. It is also to be understood that the sequential, or stage loading, of the helical spring 42 to create a rearwardly directed axial biasing force urging the propeller blades to rotate into a position of maximum pitch is shown and described as it is believed to function, but, it is conceivable that both stages of spring loading occur concurrently. I have chosen, however, to describe the spring loading as occurring sequentially in order to more clearly describe and define the mechanical operation of my improved automatically, variable pitch propeller.

FIG. 17 of the drawing illustrates an alternate form for the retaining ring 35 shown in FIG. 5. By providing a plurality of retaining rings, each having a pair of similar, opposed arcuate slots therein of varying sizes, or preferably, as shown in FIG. 17, one ring having a plurality of pairs of opposed slots therein, the flexibility and scope of my improved propeller is significantly increased. It will be apparent to one skilled in the art that by enlarging the arcuate slot in the retaining ring, the range between positions of maximum and minimum pitch of the blades 10 will be increased; or conversely, if the slot is made smaller, it will be decreased. In FIG. 17, a retaining ring 35-a is shown having a plurality of pairs of opposed, similar slots 36, 36-a and 36-b, respectively. By mounting the retaining ring 35-a whereby the stops 23—23 are received by the slots 36-a—36-a, the range between positions of maximum and minimum blade pitch will be greater than if the said stops were received in the slots 36—36.

It is conceivable that under certain conditions of operation, it may be desirable to lock the blades into a fixed position of pitch. By providing a slot, as at 36-b, of the same size as the stops 23—23 to be received therein, the blade pitch will remain constant and will not vary under changing conditions of applied torque and blade loading.

I claim:

1. An automatically adjustable propeller adapted to be mounted on an engine drive shaft, said propeller including a mounting member adapted to be affixed to said drive shaft coaxially thereof, a gear slidable axially on said mounting member in forward and rearward directions and secured against rotation relatively thereto, a body portion slidable axially on said mounting member with said gear and rotatable relatively thereto, propeller blades extending radially from said body portion and mounted therein for rotation between positions of maximum and minimum pitch, said propeller blades having pinion portions engageable with said gear, a rack engageable with said pinion portions, and a spring biasing said rack to rotate said propeller blades toward a position of maximum pitch and said body portion in the direction of forward rotation of said propeller through engagement of said pinion portions with said gear, and stop means for limiting the rotation of said body portion relative to said gear.

2. An automatically adjustable propeller adapted to be mounted on an engine drive shaft, said propeller including an inner sleeve, means for fixedly securing said inner sleeve to said drive shaft, an outer sleeve, a coupling slidably and non-rotatably connecting said outer sleeve to said inner sleeve, a gear on said outer sleeve, a body portion rotatably secured to said outer sleeve, propeller blades extending radially from said body portion and mounted therein for rotation between positions of maximum and minimum pitch, each of said blades having a coaxial pinion portion engageable with said gear, a spring support member stationary relative to said inner sleeve, a rack axially slidable in said body portion and engaged with said pinion portions, a spring member acting between said rack and said spring support and biasing said rack to rotate said blades toward a position of maxmum pitch and said body portion in the direction of the normal forward rotation of said propeller, and stop means for limiting the rotation of said body portion relatively to the said outer sleeve whereby to cause said spring to bias said body portion and said outer sleeve rearwardly relative to said inner sleeve.

3. An automatically adjustable propeller adapted to be mounted on an engine drive shaft, said propeller including an inner sleeve, means for fixedly securing said inner sleeve on said drive shaft, an outer sleeve non-rotatably mounted on said inner sleeve for axial sliding movement relative thereto, a collar on said outer sleeve having a gear thereon, a body portion having a hub rotatable on said outer sleeve, means for securing said hub against axial movement relative to said outer sleeve, a plurality of propeller blades extending radially from said hub and mounted therein for rotation between positions of maximum and minimum pitch, each of said blades having a pinion portion engaged with the gear on said collar, a spring support surrounding said outer sleeve, a rack support surrounding said spring support, a rack extending from said rack support into engagement with the pinion portion on each of said blades, spring means acting between said spring support and said rack and biasing said rack to rotate said blades toward a position of maximum pitch and said hub in the direction of forward rotation of said propeller, a stop ring secured to said hub for rotatably securing said hub to the said collar, a projection on said collar cooperating with said stop ring to limit rotation of said hub relatively to said collar whereby to cause said spring means to bias said outer sleeve and said hub rearwardly upon said inner sleeve.

4. An automatically adjustable propeller as set forth in claim 3 including means for adjusting said spring support to vary the biasing force of said spring.

5. An automatically adjustable propeller as set forth in claim 3 including an axial screw threaded to said spring support and adapted to be secured in fixed position relative to said inner sleeve for varying the biasing force of said spring.

6. An automatically adjustable propeller as set forth in claim 3 including an axial screw threaded to said spring support and adapted to be secured in fixed position relative to said inner sleeve for adjusting the biasing force of said spring, said screw being adjustable from the exterior of said propeller.

7. An automatically adjustable propeller as set forth in claim 3 including retaining means adapted to be affixed to said drive shaft to limit rearward movement of said body portion relatively to said inner sleeve.

8. An automatically adjustable propeller as set forth in claim 3 including a retaining member adapted to be secured to said drive shaft for engagement by the end of said outer sleeve to limit the rearward movement thereof relatively to said inner sleeve.

9. An automatically adjustable propeller as set forth in claim 3 including a retaining member, bayonet-locking means for connecting said retaining member to said drive shaft for engagement by said outer sleeve to limit rearward movement thereof relative to said inner sleeve, and interlocking means on said spring support and said retaining member for rotating said retaining member to effect engagement and disengagement of said locking means.

10. An automatically adjustable propeller as set forth in claim 3 including an extension member adapted to be secured to the end of said drive shaft, a retaining member secured to said extension member with a bayonet lock connection for engagement by said outer sleeve to limit rearward movement of said body portion relatively to said drive shaft, a retaining spring acting upon said retaining member to prevent disengagement of said bayonet lock connection, and means on said spring support normally spaced from said retaining member and engageable therewith to move said retaining member against said retaining spring and rotate it to engage and disengage said bayonet connection.

11. An automatically adjustable propeller as set forth in claim 3, including a retaining member for engagement by said outer sleeve to limit rearward movement of the body portion relatively to the inner sleeve, means including a bayonet connection for securing said retaining member in fixed position relatively to said drive shaft, a retaining spring acting upon said retaining member to prevent disengagement of said bayonet connection, inter-engageable means on said spring support and said retaining member for moving said retaining member against said retaining spring and rotating said retaining member to disengage said bayonet connection, and an adjustable screw threaded to said spring support and engageable with said drive shaft for adjusting said spring support to vary the bias of said spring means, said adjusting screw normally spacing said spring support from the retaining member to prevent engagement of said inter-engageable means during normal operation of the propeller.

References Cited in the file of this patent
UNITED STATES PATENTS

| | | |
|---|---|---|
| 1,864,045 | Kellogg et al. | June 21, 1932 |
| 1,952,798 | Havill | Mar. 27, 1934 |
| 1,980,272 | Havill et al. | Nov. 13, 1934 |